United States Patent
Garimella et al.

(10) Patent No.: US 6,938,136 B2
(45) Date of Patent: Aug. 30, 2005

(54) METHOD, SYSTEM, AND PROGRAM FOR PERFORMING AN INPUT/OUTPUT OPERATION WITH RESPECT TO A LOGICAL STORAGE DEVICE

(75) Inventors: Neeta Garimella, San Jose, CA (US); Alexei Kojenov, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 10/619,986

(22) Filed: Jul. 14, 2003

(65) Prior Publication Data

US 2005/0015415 A1 Jan. 20, 2005

(51) Int. Cl.$^7$ ............................................. G06F 12/00
(52) U.S. Cl. ..................... 711/162; 711/111; 710/74; 710/36
(58) Field of Search .............................. 710/62, 74, 72, 710/32, 33; 711/100, 111, 112, 162

(56) References Cited

U.S. PATENT DOCUMENTS

| | | | |
|---|---|---|---|
| 5,907,672 A | 5/1999 | Matze et al. | |
| 6,185,575 B1 | 2/2001 | Orcutt | |
| 6,377,958 B1 | 4/2002 | Orcutt | |
| 6,453,383 B1 | 9/2002 | Stoddard et al. | |
| 6,714,952 B2 * | 3/2004 | Dunham et al. | 707/204 |
| 6,772,309 B1 * | 8/2004 | Ohr et al. | 710/32 |
| 2002/0019935 A1 | 2/2002 | Andrew et al. | |
| 2002/0107877 A1 | 8/2002 | Whiting et al. | |

OTHER PUBLICATIONS

Hoese, Geoff. "Server–Free Backup/Restore", *White Paper*, © 2001 Crossroads Systems, Inc., pp. 1–5.

IBM Corporation. "Centralized and Rapid Backup/Restore for Work Lan File Services/VM", *IBM Technical Disclosure Bulletin*, vol. 35, No. 3, Aug. 1992. pp. 286–289.

IBM Corporation. "Reconciling a File System to a Point in Time Using Incremental Backup Data", *Research Disclosure No. 430120*, Feb. 2000. pp. 337.

IBM Redbooks. "IBM Tivoli Storage Manager: LAN/WAN Backup; Server Free Backup; LANFree Backup; and Split–Mirror Backup–What Does it All Mean?", [online], Dec. 2002, [Retrieved on Apr. 23, 2003]. Retrieved from the internet at <URL: http://publib–b.boulder.ibm.com/Redbooks.nsf/Redbooks.nsf/RedbookAbstracts/tips0118.html?Open>.

Kadleck, Barry, Nigel Bentley, Michael Dann, Steven Pemberton, & Bjorn Roden. "IBM Tivoli Storage Manager Version 5.1: Technical Guide", © 2002 IBM Corporation. pp. i–xviii, 1–347.

MacFarland, Anne, Joe DeNatale, and Mike Fisch. "Business Continuity Goes Better with SANs– The 3 Rs of Resilience", *The Clipper Group Explorer*, Jan. 25, 2002, pp. 1–8.

(Continued)

*Primary Examiner*—Kim Huynh
(74) *Attorney, Agent, or Firm*—David W. Victor; Konrad Raynes & Victor LLP

(57) ABSTRACT

Provided are a method, system, and program for performing an Input/Output (I/O) operation with respect to a logical device capable of being accessed by multiple host systems. Metadata in the logical device that is required in order to access the data in the logical device is overwritten to prevent at least one host system from accessing the data in the logical device represented by the overwritten metadata. An I/O operation is performed with respect to the logical device. Valid metadata is written to the logical device to enable host systems to access the data in the logical device represented by the metadata.

33 Claims, 5 Drawing Sheets

OTHER PUBLICATIONS

Oxford University Computing Services. "IBM Tivoli Storage Manager for Windows Backup–Archive Clients Installation and User's Guide", [online], [Retrieved on Apr. 23, 2003]. Retrieved from the Internet at <URL: http://www.oucs.ox.ac.uk/hfs/tsm/515/wine/ans60017.htm>.

Sudlow, Paul. "Server Free Backup Under the Covers", Whitepapers, [online], [Retrieved on Apr. 23, 2003]. Retrieved from the Internet at <URL: http://data.fibre-channel-europe.com/technology/whitepapers/wp_250601_1.html>.

U.S. Appl. No. 10/091,797, filed Mar. 6, 2002, entitled "Multi–Session No Query Restore", invented by R. Edwards, B. Fruchman, and O. Vargas.

Weber, Ralph O. (Ed.). "Information Technology– SCSI Primary Commands– 2 (SPC–2)", Revision 20, Jul. 18, 2001, pp. i–xvi, 1–275.

* cited by examiner

METHOD, SYSTEM, AND PROGRAM FOR PERFORMING AN INPUT/OUTPUT OPERATION WITH RESPECT TO A LOGICAL STORAGE DEVICE

BACKGROUND OF THE INVENTION

1. Field of the Invention

The present invention is related to a method, system, and program for performing an input/output operation with respect to a logical device.

2. Description of the Related Art

In certain network computing environments, such as in a Fibre Channel Storage Area Network (SAN), peer-to-peer arrangement, Ethernet, etc., numerous of the systems connected to the network may have access to the file systems of other hosts connected to the network. In such environments, certain operating systems, such as the Microsoft® Windows® 2000 and XP operating systems that include the NTFS file system, are designed to assume that any visible storage, whether in a network or locally connected, is owned by the local host. In such environments, if the local hosts access the file system, created on a storage device on the network, then data corruption may occur if the different hosts, acting independently, perform conflicting operations with respect to a volume.

Certain restore operations, such as a server-free full volume restore, allow one host to perform the restore using an extended copy command. A server-free backup/restore environment typically involves a server controlling a SAN router or other data movement device to backup or restore data between a backup storage device and a logical volume created on a storage device coupled to the network. In such server-free environment, multiple hosts on the network may perform a restore operation to cause the copying of the data to restore from the backup device to the target volume being restored. In such a server-free restore operation, a server does not have to copy the restore data into the server memory to build an image of the restore data, and then transfer that image to the backup device to restore. Instead, in the server-free environment, only the source and destination devices are involved, and the backup or restore copy operation is performed by a third-party copy function, typically initiated from a storage manager server During such server free restore operations by one host, another host may access and write to the volume being restored. Such intervening writes during the restore may result in file system corruption and data loss. Further, the host writing to the volume being restored by another host may claim ownership of the file system occupying the volume, and then prevent the host that initiated the server-free restore from accessing the volume. When such a conflict occurs, the file system repair utility, such as the CHKDSK utility in the Microsoft Windows** operating system, needs to be called to attempt to repair the problem and recover data.

**Microsoft and Windows are registered trademarks of Microsoft Corporation.

Accordingly, there is a need in the art for improved techniques to improve coordination of volume access operations to avoid conflicts and corruption problems when multiple devices have access to the volume over a network.

SUMMARY OF THE PREFERRED EMBODIMENTS

Provided are a method, system, and program for performing an Input/Output (I/O) operation with respect to a logical device capable of being accessed by multiple host systems. Metadata in the logical device that is required in order to access the data in the logical device is overwritten to prevent at least one host system from accessing the data in the logical device represented by the overwritten metadata. An I/O operation is performed with respect to the logical device. Valid metadata is written to the logical device to enable host systems to access the data in the logical device represented by the metadata.

In further implementations, the metadata overwritten comprises file system metadata.

Still further, before overwriting the metadata, the metadata is copied to a local memory, wherein writing the metadata to the logical device after performing the I/O operation comprises copying the metadata from the local memory to the logical device.

In additional implementations, the I/O operation comprises an operation to restore an image to the logical device from a backup storage device. In such implementations, the metadata is restored to the logical device from the backup storage device. The restored metadata is buffered before overwriting the restored metadata on the logical device and the image is restored to the logical device from the backup storage device, wherein writing the valid metadata to the logical device comprises writing the buffered restored metadata to the logical device.

Described implementations provide techniques for one host accessing data in a file system to prevent another host from performing an intervening access of the data the host is accessing.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
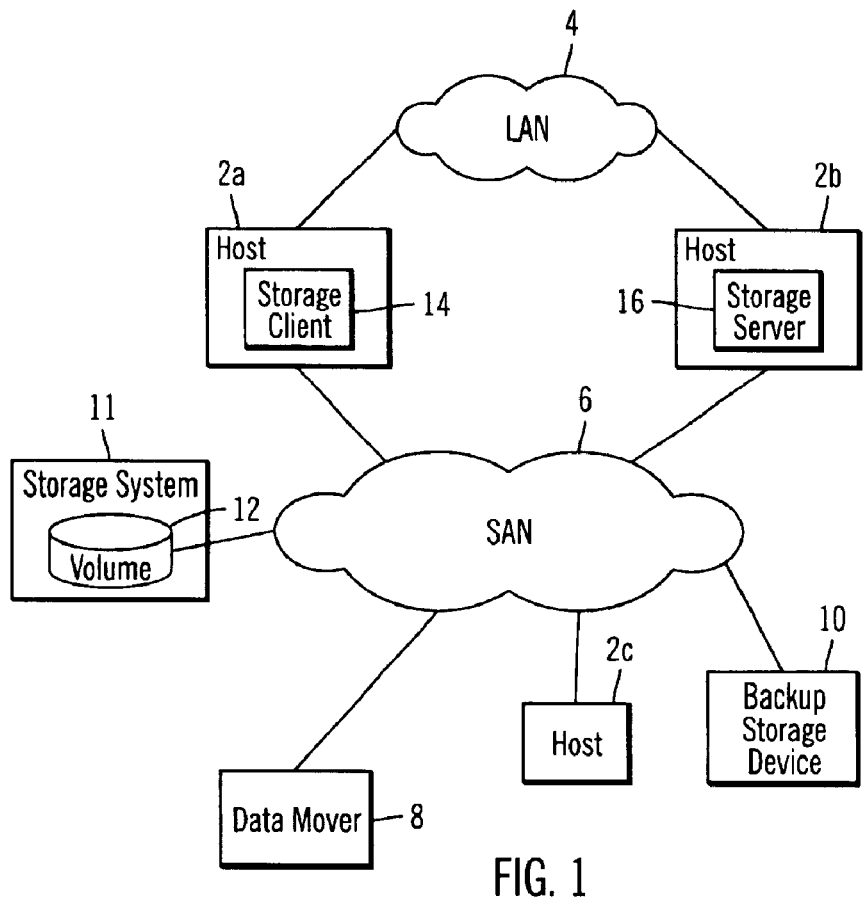
FIGS. 1 and 4 illustrate network computing environments in which aspects of the invention are implemented.

FIG. 1 illustrates a server-free network computing environment in which certain embodiments of the invention are implemented. Two host systems 2a, 2b, are connected to two networks, shown as a Local Area Network (LAN) 4, using the Ethernet protocol, and a Storage Area Network (SAN) 6, using the Fibre Channel protocol. Another host 2c is connected to the SAN. In alternative implementations, networks and connections other than SAN and LAN may be used to implement the two networks 4, 6 to which the hosts 2a, 2b connect. A data mover 8, backup storage device 10, and storage system 11 on which logical volume 12 resides are shown as coupled to the SAN 6. The logical volume 12 may be managed from host 2a. Host 2a includes a storage client 14 program to perform storage client operations, such as managing the backup and restore of data on volume 12 and the host 2b includes a storage server 16 program to perform storage server operations in response to request from multiple storage clients 14, such as managing the backup and restore of the data with respect to storage clients 14, discovering devices in the SAN 6, ensuring all the required paths exist, transforming extents to copy commands, mounts, and positioning tape devices, recording information about the backup/restore operations in a database, etc.

The host systems 2a, 2b, 2c may comprise any computing device known in the art, such as a server class machine, workstation, desktop computer, etc. The backup storage device 10 may comprise a mass storage device known in the art suitable for backing-up data, such as a tape storage device, e.g., a tape library, or one or more interconnected disk drives configured as a Redundant Array of Independent Disks (RAID), Just a Bunch of Disks (JBOD), Direct Access Storage Device (DASD), etc. The storage system 11 may comprise a mass storage device comprised of hard disk drives in any configuration, or another type of storage device. The data mover 8 may comprise a SAN data gateway, router or any other device suitable for moving data from one component to another in a network. The data mover 8 is capable of accessing the data in the volume 12. In further implementations, the data mover 8 may have alternative connections to the volume 12 or backup storage device 10, such as through a Small Computer System Interface (SCSI) connection separate from the SAN 6 or LAN 4. In certain implementations, the storage system 11 may include disk drive storage and the backup storage device 10 may be comprised of tape media.

In described implementations, after receiving a request from storage client 14, the storage server 16 would initiate an operation to restore or backup data between the volume 12 and backup storage device 10, which stores the backup copy of the volume 12. The storage system 11 in which the volume 12 is configured may include additional volumes accessible to the SAN 6. Moreover, additional hosts, storage systems, backup storage systems, etc. may be coupled to the networks, and there may be additional networks therebetween.

The storage client 14 would initiate an operation to backup or restore data at the volume 12 by communicating the request for such operation to the storage server 16. The storage server 16 would then prepare a copy command to perform the copy operation between the volume 12 and backup storage device 10 to implement the backup or restore operation, and send the copy command to the data mover 8 to perform the data copy operation. Further details of a server free backup are disclosed in the publication "IBM Tivoli Storage Manager Version 5.1: Technical Guide", document no. SG24-6554-00 (Copyright International Business Machines Corp., Jun. 2002), which publication is incorporated herein by reference in its entirety. While the data is being restored from the storage device 10 to the volume 12, the host 2c could attempt to access the volume 12 and perform an operation that would conflict with the pending restore copy operation.

Figure 2:
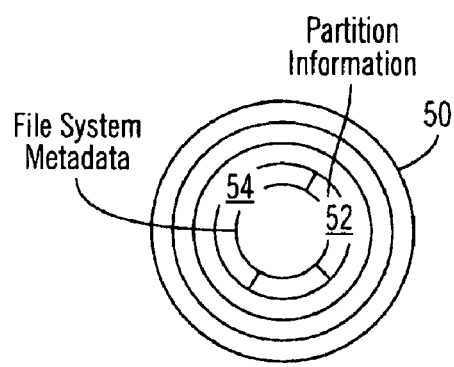
FIG. 2 illustrates information stored on a hard disk drive as known in the prior art.

FIG. 2 illustrates the types of data that may be included in the volume 12, which may be implemented in one or more disks. FIG. 2 illustrates how one disk 50 on which the volume 12 is implemented includes partition information 52 providing a partition table indicating how data is arranged in partitions and file system metadata 54 which indicates how data blocks in the disk are assigned to files and directories in the volume 12. Any host 2a, 2b, 2c accessing the volume 12 would need to access the file system metadata to ascertain how data is organized on the disk 50. An application running on a host 2a or 2c accessing the data on volume 12 would communicate the access request to the file system, which would then need to read the file system metadata 54 to understand the arrangement of the data in the volume 12. For instance, in many file systems, the first sector (512 bytes) of a volume most often contains an important part of file system metadata 54 and in most cases overwriting just this sector will be enough to disable the file system so it is unusable to other hosts.

Figure 3:
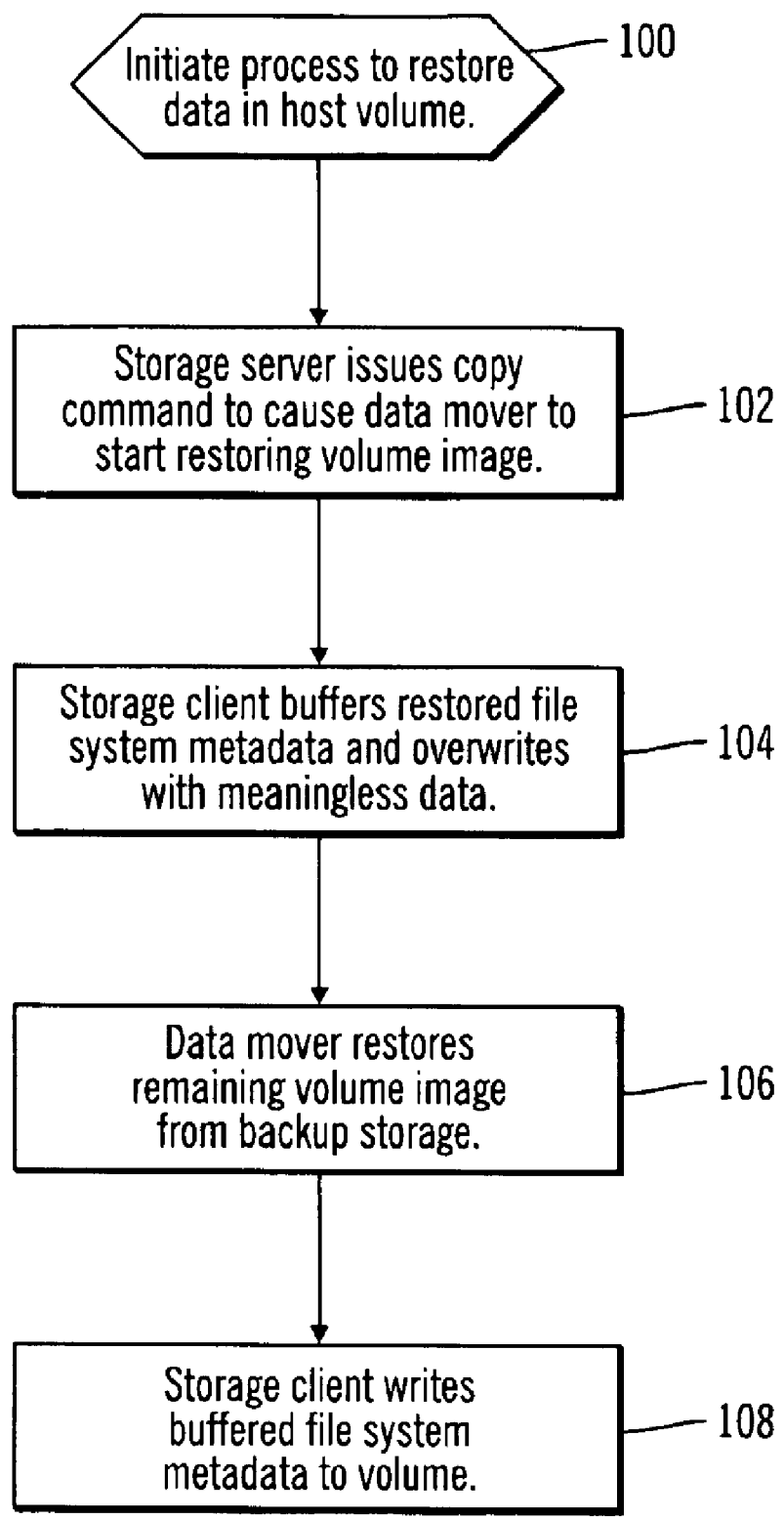
FIG. 3 illustrates operations performed to restore data in a network environment in accordance with implementations of the invention.

FIG. 3 illustrates operations performed by the storage server (or other component that manages the restore operation) to restore an image stored in the backup storage device 10 to the volume 12. Upon a storage client 14 initiating (at block 100) the restore operation, the storage server 16 would issue a copy command to cause the data mover 8 to start restoring (at block 102) the volume image from the backup storage device 10. The copy command issued by the storage server 16 may comprise the SCSI extended copy command that causes data to be transferred directly between devices over a SAN or SCSI bus. In certain implementations, the file system metadata 54 would be restored first. In such case, the storage client 14 would buffer (at block 104) the restored file system metadata 54 and then overwrite the restored file system metadata on the volume 12 with meaningless data, e.g., all zeroes, ones, etc. This will prevent any other host, e.g., host 2c, from accessing the volume in a meaningful way because the host 2c could not provide any intelligible meaning to the data stored in the volume 12 due to the nullification of the file system metadata 54. The data mover 8 would further copy (at block 106) the remaining volume image from the backup storage device 10 to the volume 12. When the image is completely restored, the storage client 14 would then write the buffered file system metadata 54 back to the volume 12 so that other hosts may access the data therein. In this way, during the pendency of the restore, the volume 12 is inaccessible to any other hosts that would otherwise be capable of performing intervening Input/Output (I/O) operations that could corrupt data or interfere with the restore operation.

The above described implementations concerned operations with respect to a volume in a server-free backup and restore environment. However, the above described process can apply to any type of I/O operation when a volume is accessible to multiple hosts or devices in a network, where the network can be any network known in the art, such as a Wide Area Network (WAN), wireless network (Wireless Fidelity), etc.

Figure 4:
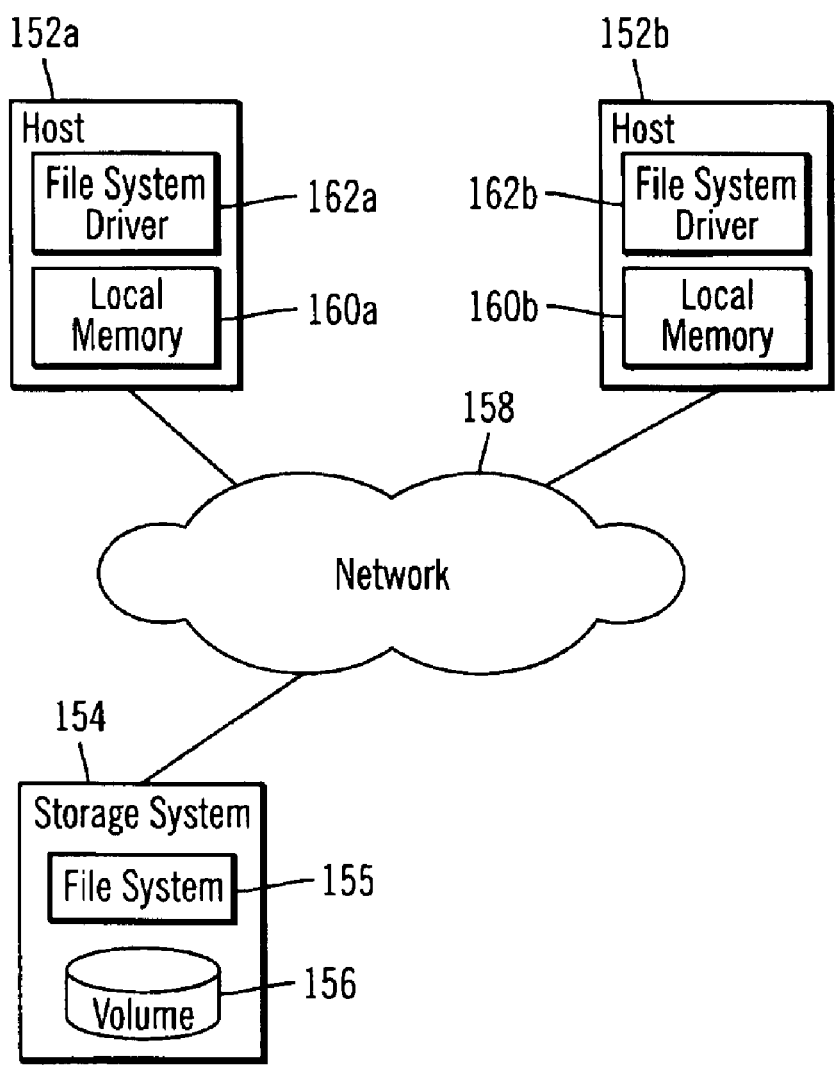

FIG. 4 illustrates an alternative computing environment in which the invention may be implemented. Multiple host systems 152a, 152b and a storage system 154 containing a volume 156, which is formatted as a file system, are coupled to a network 158, such that both hosts 152a, 152b can perform I/O operations with respect to the storage system 154 and volume 156 therein over the network 158. The storage system 154 includes a file system 155, having the file system metadata, for managing I/O requests to the volume 156. Both hosts 152a, 152b may include local memory 160a, 160b and file system drivers 162a, 162b to interface with the storage file system 155 over the network 158 to perform read/write access operations with respect to the volume 156.

The storage system 154 may be coupled in any manner to the network 156, either directly or indirectly through another device or host, or through any network connection known in the art.

Figure 5:
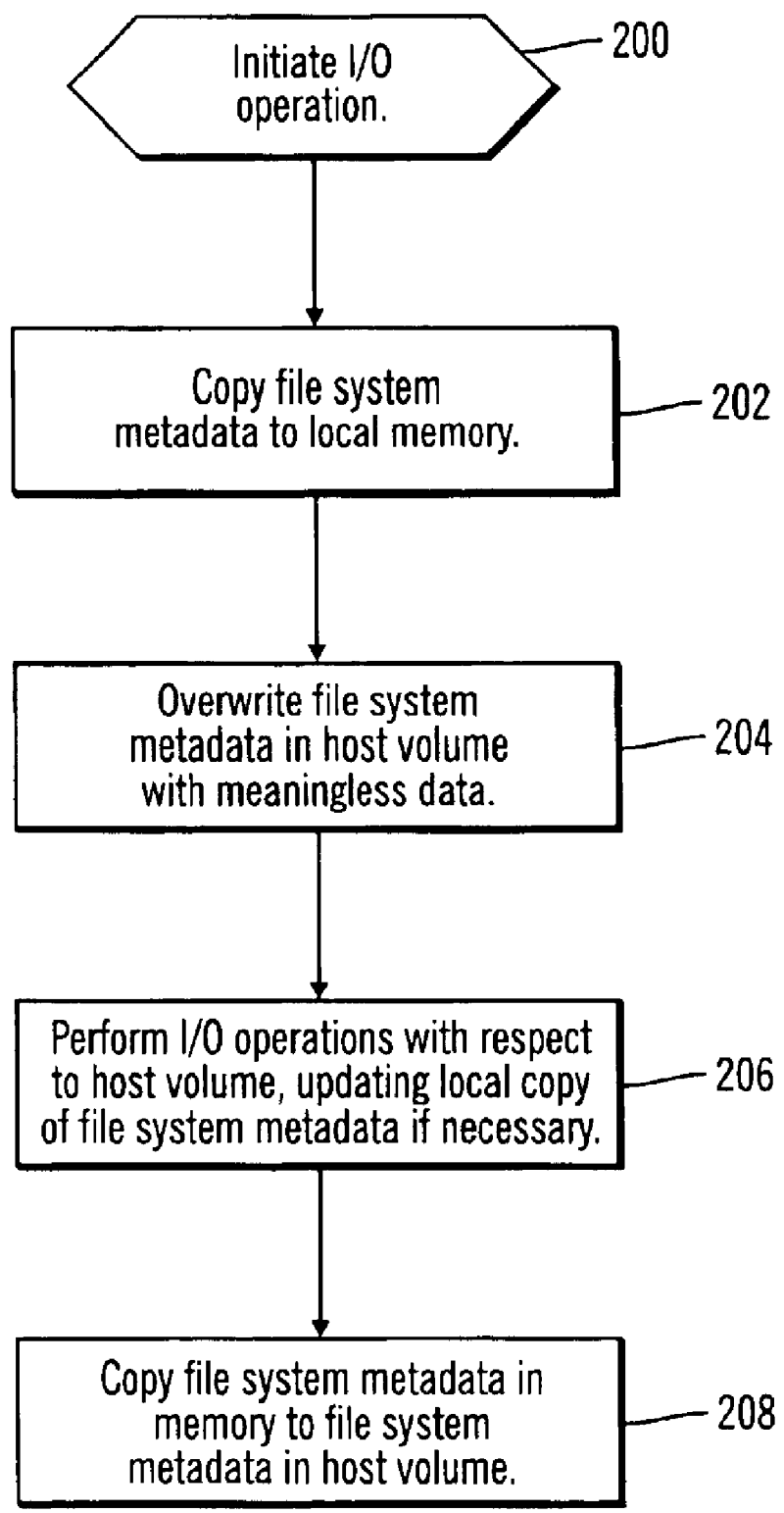
FIG. 5 illustrates operations performed to perform an Input/Output operation in accordance with implementations of the invention.

FIG. 5 illustrates operations performed by the host file system drivers 162*a*, 162*b* to exclusively access data in the volume 156 by rendering a volume or portion thereof inaccessible to other hosts when performing I/O access. Upon initiating (at block 200) an I/O operation, the host file system driver 162*a*, 162*b* copies (at block 202) the file system metadata 54 (FIG. 2) in the volume 154 to local memory 160*a*, 160*b* for use by the host 152*a*, 152*b* performing the I/O. The host file system driver 162*a*, 162*b* would then overwrite (at block 204) the file system metadata 54 in the volume 156 with meaningless data to prevent any other host 152*a*, 152*b* or computing device from performing a conflicting operation with respect to the volume 156. Other hosts would not be able to access the volume because the metadata, which is needed in order to access the content of the volume 156, is replaced with meaningless data. The host file system driver 162*a*, 162*b* would then perform (at block 206) the requested I/O operations. As part of performing the I/O operations, the host file system driver 162*a*, 162*b* may update the file system metadata 54 in local memory 160*a*, 160*b* to reflect the changes. Upon completing the I/O operations, the host 152*a*, 152*b* would then copy (at block 108) the file system metadata buffered in local memory 158*a*, 158*b*, which may have been modified, to the file system metadata 54 in the volume 156 so that other hosts 152*a*, 152*b* can access the volume 156.

With the logic of FIG. 5, in certain implementations, the host file system driver 162*a*, 162*b* may buffer and overwrite with meaningless data all the file system metadata 54 for the volume 156 to render the entire volume 156 inaccessible to other hosts. Alternatively, the host file system driver 162*a*, 162*b* may buffer and overwrite only that portion of the file system metadata 54 specific to the one or more files in the volume 156 the host file system driver 162*a*, 162*b* is accessing in order to only preclude any other hosts 152*a*, 152*b* from accessing the particular files that the file system driver 162*a*, 162*b* is accessing. This alternative technique allows hosts to access other files in the volume 156 whose metadata has not been overwritten.

The described implementations provide a technique to allow one device in a network environment to prevent other devices from accessing a storage logical device (volume) by overwriting the file system metadata that would be needed in order to access the volume.

ADDITIONAL IMPLEMENTATION DETAILS

The file management techniques described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, the device accessing the volume would overwrite the file system metadata. In certain implementations, the accessing device may overwrite some or all of the file system metadata to make it unintelligible to any other systems that would attempt to access the volume. In alternative implementations, the device accessing the volume may overwrite some section of the volume other than the file system metadata which would make the volume inaccessible to other devices.

In described implementations, the I/O operations were performed with respect to a logical volume managed as a file system. In alternative implementations, the I/O operations may be performed with respect to any type of logical device known in the art.

In the described implementations, the SCSI-3 Extended Copy Command was used to transfer data between devices. In alternative implementations, other commands in alternative formats may be used to perform the device-to-device copy operations described herein.

FIGS. 3 and 5 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 6:
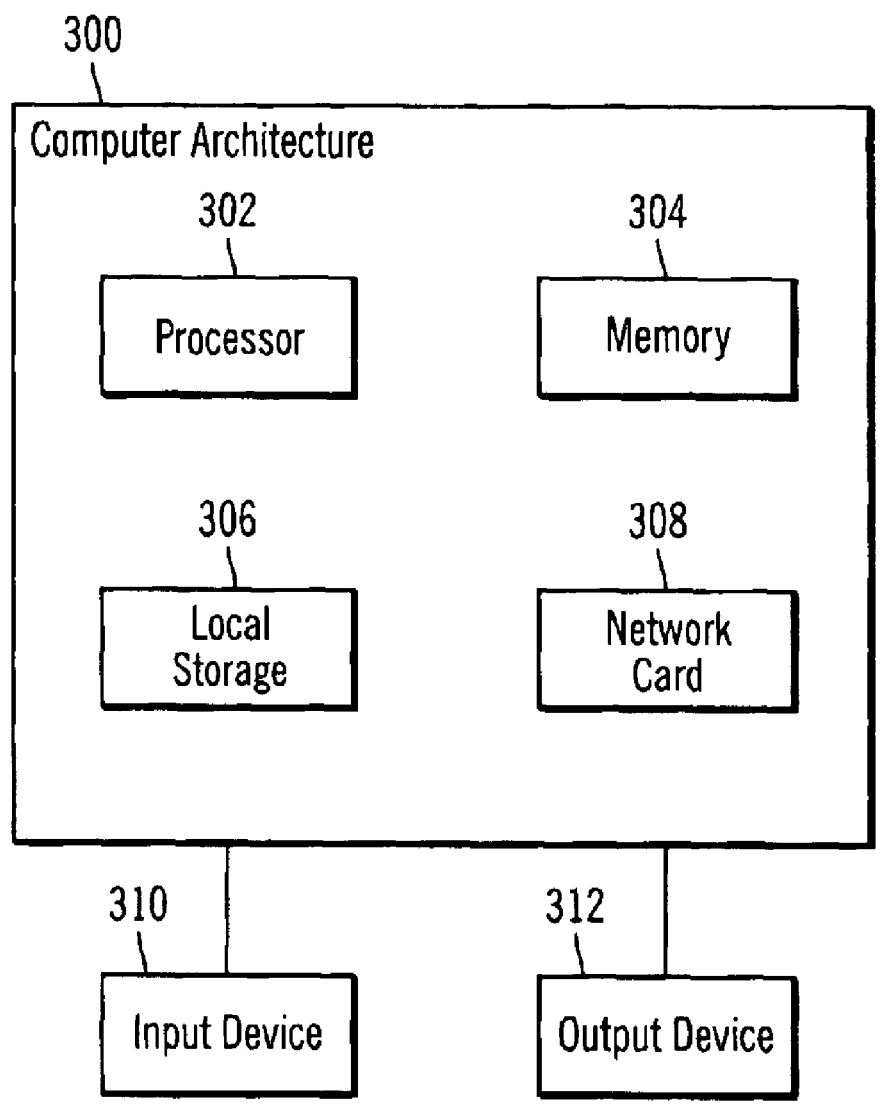
FIG. 6 illustrates a computing architecture that may be used to implement the network components described with respect to FIGS. 1 and 4.

FIG. 6 illustrates one implementation of a computer architecture 300 of the network components shown in FIGS. 1 and 4, such as the host, data mover, storage device, etc. The architecture 300 may include a processor 302 (e.g., a microprocessor), a memory 304 (e.g., a volatile memory device), and local storage 306 (e.g., a non-volatile storage, such as magnetic disk drives, optical disk drives, a tape drive, etc.). The local storage 306 may comprise an internal storage device or an attached or network accessible storage. Programs in the local storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for performing an Input/Output (I/O) operation with respect to a logical device capable of being accessed by multiple host systems, comprising:
   overwriting metadata in the logical device that is required in order to access the data in the logical device to prevent at least one host system from accessing the data in the logical device represented by the overwritten metadata;
   performing an I/O operation with respect to the logical device; and
   writing valid metadata to the logical device to enable host systems to access the data in the logical device represented by the metadata.

2. The method of claim 1, wherein the metadata is written to the logical device after performing the I/O operation.

3. The method of claim 1, wherein the metadata overwritten comprises file system metadata.

4. The method of claim 1, further comprising:
   before overwriting the metadata, copying the metadata to a local memory, wherein writing the metadata to the logical device after performing the I/O operation comprises copying the metadata from the local memory to the logical device.

5. The method of claim 4, further comprising:
   modifying the metadata in the local memory when performing the I/O operation, wherein the valid metadata written to the logical device comprises the modified metadata.

6. The method of claim 4, wherein the overwritten and copied metadata comprises sufficient metadata for the logical device to prevent at least one host system from accessing any data in the logical device.

7. The method of claim 4, wherein the overwritten and copied metadata comprises a portion of the metadata for the logical device, wherein the portion of the metadata corresponds to data in the logical device that is subject to the I/O operation, wherein overwriting the portion of the metadata prevents at least one host system from accessing the data that is subject to the I/O operation, and wherein at least one host can access data in the logical device during the I/O operation corresponding to metadata that is not the portion of the overwritten metadata.

8. The method of claim 1, wherein the I/O operation comprises an operation to restore an image to the logical device from a backup storage device.

9. The method of claim 8, further comprising:
   restoring the metadata to the logical device from the backup storage device;
   buffering the restored metadata before overwriting the restored metadata on the logical device; and
   restoring the image to the logical device from the backup storage device, wherein writing the valid metadata to the logical device comprises writing the buffered restored metadata to the logical device.

10. The method of claim 8, wherein both the logical device and backup storage device are coupled to a network, wherein the image to restore is copied from the storage device to the logical device over the network.

11. The method of claim 8, wherein a data mover coupled to the network copies the restore image from the backup storage device to the logical device over the network, wherein a storage client and storage server are separately coupled to the network, and wherein the network to which the logical device and the backup storage device are coupled comprises a first network, further comprising:
   communicating from the storage client a request to the storage server to restore the image to the logical device over a second network, wherein the storage server causes the data mover to copy the restore image from the backup storage device to the logical device in response to the request from the storage client.

12. A system for performing an Input/Output (I/O) operation, comprising:
   a plurality of host systems;
   a logical device;
   a network, wherein the host systems and logical device are in data communication over the network;
   a program executed by one host system to perform operations comprising:
      (i) overwriting metadata in the logical device that is required in order to access the data in the logical device to prevent at least one host system from accessing the data in the logical device represented by the overwritten metadata;
      (ii) performing an I/O operation with respect to the logical device; and
      (iii) writing valid metadata to the logical device to enable host systems to access the data in the logical device represented by the metadata.

13. The system of claim 12, wherein the metadata is written to the logical device after performing the I/O operation.

14. The system of claim 12, wherein the metadata overwritten comprises file system metadata.

15. The system of claim 12, wherein the operations performed by the program further comprise:
   before overwriting the metadata, copying the metadata to a local memory, wherein writing the metadata to the logical device after performing the I/O operation comprises copying the metadata from the local memory to the logical device.

16. The system of claim 15, wherein the operations performed by the program further comprise:
   modifying the metadata in the local memory when performing the I/O operation, wherein the valid metadata written to the logical device comprises the modified metadata.

17. The system of claim 15, wherein the overwritten and copied metadata comprises sufficient metadata for the logical device to prevent at least one host system from accessing any data in the logical device.

18. The system of claim 15, wherein the overwritten and copied metadata comprises a portion of the metadata for the logical device, wherein the portion of the metadata corresponds to data in the logical device that is subject to the I/O operation, wherein overwriting the portion of the metadata prevents at least one host system from accessing the data that is subject to the I/O operation, and wherein at least one host can access data in the logical device during the I/O operation corresponding to metadata that is not the portion of the overwritten metadata.

19. The system of claim 12, further comprising:
a backup storage device coupled to the network, wherein the I/O operation comprises an operation to restore an image to the logical device from the backup storage device.

20. The system of claim 19, wherein the operations performed by the program further comprise:
restoring the metadata to the logical device from the backup storage device;
buffering the restored metadata before overwriting the restored metadata on the logical device; and
restoring the image to the logical device from the backup storage device, wherein writing the valid metadata to the logical device comprises writing the buffered restored metadata to the logical device.

21. The system of claim 19, wherein both the logical device and backup storage device are coupled to a network, wherein the image to restore is copied from the storage device to the logical device over the network.

22. The system of claim 19, further comprising:
a data mover coupled to the network, wherein the data mover copies the restore image from the backup storage device to the logical device over the network;
a storage client coupled to the network;
a storage server coupled to the network, wherein the network to which the logical device and the backup storage device are coupled comprises a first network;
wherein the operations performed by the program further comprise communicating from the storage client a request to the storage server to restore the image to the logical device over a second network, wherein the storage server causes the data mover to copy the restore image from the backup storage device to the logical device in response to the request from the storage client.

23. An article of manufacture implemented in a computer readable device for performing an Input/Output (I/O) operation with respect to a logical device capable of being accessed by multiple host systems, wherein the article of manufacture causes operations to be performed, the operations comprising:
overwriting metadata in the logical device that is required in order to access the data in the logical device to prevent at least one host system from accessing the data in the logical device represented by the overwritten metadata;
performing an I/O operation with respect to the logical device; and
writing valid metadata to the logical device to enable host systems to access the data in the logical device represented by the metadata.

24. The article of manufacture of claim 23, wherein the metadata is written to the logical device after performing the I/O operation.

25. The article of manufacture of claim 23, wherein the metadata overwritten comprises file system metadata.

26. The article of manufacture of claim 23, wherein the operations further comprise:
before overwriting the metadata, copying the metadata to a local memory, wherein writing the metadata to the logical device after performing the I/O operation comprises copying the metadata from the local memory to the logical device.

27. The article of manufacture of claim 26, wherein the operations further comprise:
modifying the metadata in the local memory when performing the I/O operation, wherein the valid metadata written to the logical device comprises the modified metadata.

28. The article of manufacture of claim 26, wherein the overwritten and copied metadata comprises sufficient metadata for the logical device to prevent at least one host system from accessing any data in the logical device.

29. The article of manufacture of claim 26, wherein the overwritten and copied metadata comprises a portion of the metadata for the logical device, wherein the portion of the metadata corresponds to data in the logical device that is subject to the I/O operation, wherein overwriting the portion of the metadata prevents at least one host system from accessing the data that is subject to the I/O operation, and wherein at least one host can access data in the logical device during the I/O operation corresponding to metadata that is not the portion of the overwritten metadata.

30. The article of manufacture of claim 23, wherein the I/O operation comprises an operation to restore an image to the logical device from a backup storage device.

31. The article of manufacture of claim 30, wherein the operations comprise:
restoring the metadata to the logical device from the backup storage device;
buffering the restored metadata before overwriting the restored metadata on the logical device; and
restoring the image to the logical device from the backup storage device, wherein writing the valid metadata to the logical device comprises writing the buffered restored metadata to the logical device.

32. The article of manufacture of claim 30, wherein both the logical device and backup storage device are coupled to a network, wherein the image to restore is copied from the storage device to the logical device over the network.

33. The article of manufacture of claim 30, wherein a data mover coupled to the network copies the restore image from the backup storage device to the logical device over the network, wherein a storage client and storage server are separately coupled to the network, and wherein the network to which the logical device and the backup storage device are coupled comprises a first network, further comprising:
communicating from the storage client a request to the storage server to restore the image to the logical device over a second network, wherein the storage server causes the data mover to copy the restore image from the backup storage device to the logical device in response to the request from the storage client.

* * * * *